H. KOCH.
WIRE FORM.
APPLICATION FILED MAR. 23, 1920.
1,370,822. Patented Mar. 8, 1921.
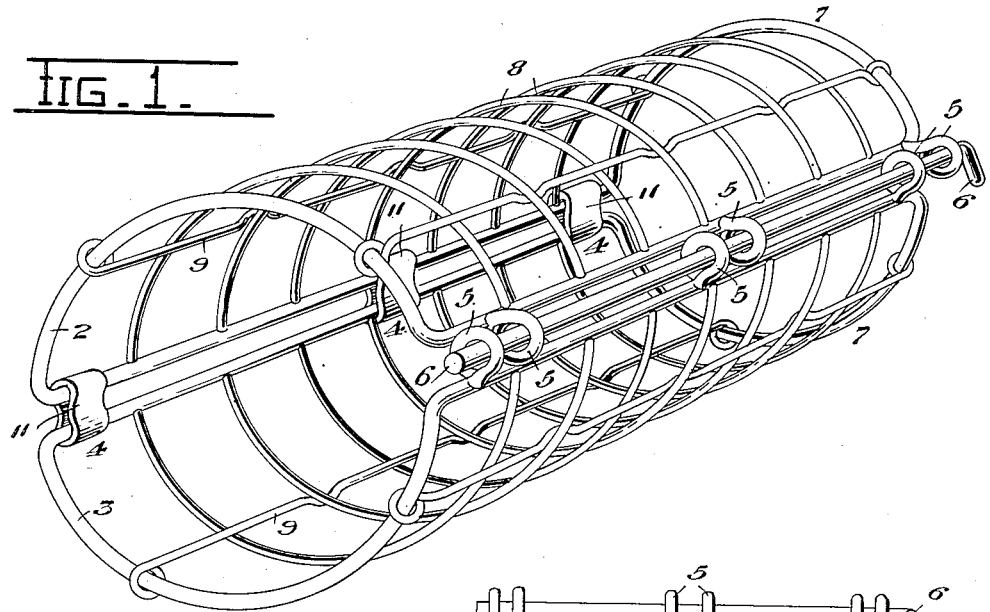
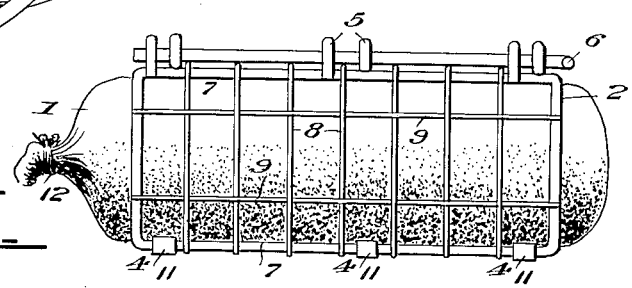
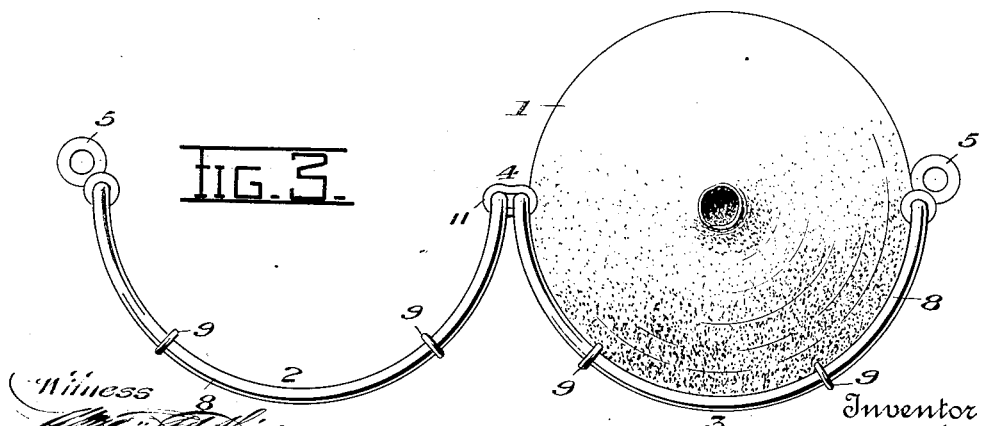
Inventor
Hans Koch,
By his Attorneys,
Clements & Clements.

UNITED STATES PATENT OFFICE.

HANS KOCH, OF EAGLE, IDAHO.

WIRE FORM.

1,370,822. Specification of Letters Patent. Patented Mar. 8, 1921.

Application filed March 23, 1920. Serial No. 368,083.

*To all whom it may concern:*

Be it known that I, HANS KOCH, a citizen of the United States, residing at Eagle, in the county of Ada and State of Idaho, have invented certain new and useful Improvements in Wire Forms, of which the following is a specification.

This invention relates to a wire form for use in sausage manufacture.

The common use of meat and sausage slicing machines in butcher shops, groceries and other establishments has created a strong demand for articles made from meat put up in straight or symmetrical packages which eliminate waste of the article. Labor and material have risen to such an extent that they have to be given consideration in the manufacture of sausage and any step which reduces labor and material costs such, for instance, as the tying of the sausage with twine, is of advantage.

Large beef bladders cannot at present be used in sausage manufacturing and have to be thrown away by small packers and sold by large packers at such small price that it barely pays for the labor of putting them up. The common practice, after taking out bladders of animals, is to clean them, blow them up and hang them in the air to dry. When used they are soaked in warm water, then turned, and finally filled.

The object of my invention is to provide an improved steel wire form or holder which will enable large, as well as small, bladders to be profitably used as casings for sausage or any form of cut or minced meat. The invention is particularly useful for holding large bladders which have heretofore had to be thrown away or sold at practically no profit.

The invention comprises an elongated, tubular, frame or form comprising halves which are hinged together along the longitudinal median line of the form and are provided with eyes or loops through which is passed a steel pin for locking the halves together. The sizes of the forms may vary. By way of illustration I may state that a large size may be twelve inches long and five inches in diameter; and intermediate or medium size, ten inches long and four and one-half inches in diameter; a small size eight inches long and four inches in diameter. The halves of the form have a main frame of very stout steel wire, say three-eighths inch stock, the body of each half of the form is composed of transverse and longitudinal stout steel wire of, say, one-eighth of an inch stock, the whole constituting a very rigid skeleton form of tubular or cylindrical shape well adapted to resist the pressure caused by the stuffing of the bladder. The wires are all galvanized and the interior of the form is smooth so that the bladder will not be punctured or abraded.

The bladder is placed in the form and the meat, minced ham, for instance, is pressed into the bladder by a sausage stuffer, the pressure being about thirty pounds to the square inch. The bladder has a tendency to expand and this form will prevent it from expanding in diameter and will force the ends of the bladder lengthwise within the form so that the minced ham, or other meat filling, will be uniformly packed throughout the length of the bladder. After the bladder has been stuffed, it will be placed in the smoke house, with the wire form still around it, and suitably smoked. It is then placed in the cooking vat with the wire form still around it and after cooking and subsequent cooling in the wire form, the locking pin is removed and the halves of the form can then be opened and removed. The sausage will then retain its shape.

Bladders prepared for use in my wire form are first cleaned, then turned and then salted down. Before they are used for minced ham, they are soaked in warm water. The bladders can also be used to good advantage fresh from the killing floor.

In the accompanying drawings,

Figure 1 is a perspective view of the steel wire form empty and closed;

Fig. 2 is a side elevation showing the stuffed and completed bladder contained within the wire form as it appears prior to or after treatment in the smoke house and in the cooking vat and through the cooking stage, prior to removal of the form at the completion of the entire operation; and Fig. 3 is an end elevation showing the form open and the sausage still in the form.

Large beef bladders in the natural stage are wide and irregular in shape; heretofore they have not been so utilized that they could be stuffed and used as sausage but have had to be thrown away or sold at a price which hardly paid for the labor of putting them up.

My improved steel wire form, shown in Fig. 1, enables large beef bladders to be filled with minced ham or other suitable filling and commercially used to good advantage, the completely stuffed and closed bladder appearing in the cylindrical form shown at 1, Figs. 2 and 3.

The form comprises similar semi-shapes 2, 3 which are hinged together at 4 and are provided with eyes or loops 5 through which a stout steel pin 6 is passed to lock the semi-shapes together. Each half of the form consists of a stout galvanized steel wire frame 7 provided with the eyes 5, and a body having substantially semi-circular stout galvanized wires 8 which are spaced suitably apart, say one inch, and have their ends connected to the longitudinal parts of the frame 7. The wires 8 are braced by longitudinal wires 9 which have bends engaging the wires 8 and which are secured at their ends to the ends of the frame 7. Stout bands 11 in the form of loops, hinge the semi-shapes 2, 3 together. The sizes of the wires and of the complete form hereinbefore given are by way of example as I do not limit myself to dimension.

Having opened up the form, the bladder is laid in one of the halves and the halves are then secured together by the pin 6. The filling is then forced into the bladder by a sausage stuffing machine at a pressure of, say thirty pounds to the square inch, until the bladder is completely filled. The form does not permit the bladder to expand beyond a diameter equal to the internal diameter of said form. The expansion of the bladder, therefore, causes it to extend lengthwise within the form, under the pressure due to the filling operation. The finally stuffed bladder is tied as at 12, Fig. 2.

The next step is to take the complete sausage with the form still fastened there-around, as shown in Fig. 2, to the smoke house where it is smoked with the form still around it. Still retaining the form around it, the sausage is next taken to the cooking vat where it is cooked with the form still around it, after which the sausage is cooled with the form still around it. This process causes the filling to set and hence when the next step is taken, which is the removal of the pin 6 and the opening out of the form, as shown in Fig. 3, the sausage remains in cylindrical shape. The form is then removed and the sausage is ready for the market.

What I claim is:

1. In a device for holding food while cooking, the combination of two semi-cylindrical members composed of heavy marginal wires and lighter transverse and longitudinal wires extending from side to side and from end to end of said members, loops surrounding the heavy wires of two of the contiguous sides of the members to form hinges and rings at the opposite sides of said members so placed as to overlap, whereby the two members may be held together by a rod passing through said rings.

2. In a device for holding food while cooking, the combination of semi-cylindrical reticulated members having heavy marginal wires, loops surrounding the heavy wires of two of the contiguous sides of the members to form hinges and rings at the opposite sides of said members so placed as to overlap, whereby the two members may be held together by a rod passing through said rings.

In testimony whereof I affix my signature.

HANS KOCH.